US011188240B2

(12) United States Patent
Shinnaka

(10) Patent No.: US 11,188,240 B2
(45) Date of Patent: Nov. 30, 2021

(54) INFORMATION PROCESSING SYSTEM AND NON-TRANSITORY COMPUTER READABLE MEDIUM FOR ACCESS PERMISSION CONTROL

(71) Applicant: FUJIFILM Business Innovation Corp., Tokyo (JP)

(72) Inventor: Yosuke Shinnaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 127 days.

(21) Appl. No.: 16/553,141

(22) Filed: Aug. 27, 2019

(65) Prior Publication Data

US 2020/0301591 A1 Sep. 24, 2020

(30) Foreign Application Priority Data

Mar. 18, 2019 (JP) .............................. JP2019-050169

(51) Int. Cl.
*G06F 3/06* (2006.01)
*G06F 21/31* (2013.01)

(52) U.S. Cl.
CPC .......... *G06F 3/0622* (2013.01); *G06F 3/0655* (2013.01); *G06F 3/0673* (2013.01); *G06F 21/31* (2013.01)

(58) Field of Classification Search
CPC .... G06F 3/0622; G06F 3/0655; G06F 3/0673; G06F 21/31; G06F 21/33; G06F 21/44; H04L 63/0807
See application file for complete search history.

(56) References Cited

U.S. PATENT DOCUMENTS

2005/0259654 A1* 11/2005 Faulk, Jr. .............. H04L 63/101
370/392
2007/0156693 A1* 7/2007 Soin .................... G06F 21/6218
(Continued)

FOREIGN PATENT DOCUMENTS

JP 2010-134602 6/2010
JP 2013-029907 2/2013

*Primary Examiner* — Larry T Mackall
(74) *Attorney, Agent, or Firm* — JCIPRNET

(57) ABSTRACT

Provided is an information processing system including plural information processing devices each of which is accessible using first authentication information that is given to each of users, that varies among the users, and that is common to the plural information processing devices, access to a specific service from an accessed information processing device among the plural information processing devices being permitted using second authentication information that is given for the specific service to each of the users and that varies among the users. The information processing system includes a display controller and a storage controller. In a case where first access permission information that corresponds to the first authentication information used to access the accessed information processing device and that is for permitting access to the specific service is not stored in a storage unit, the display controller performs control to display an input screen for inputting the second authentication information for accessing the specific service. In a case where the first access permission information is stored in the storage unit and in a case where authentication information input from the input screen matches the second authentication information that is predetermined, the storage controller permits access to the specific service and performs control to cause the storage unit to store new first access permission information for the specific service in association with the first authentication information used to access the accessed information processing device.

16 Claims, 12 Drawing Sheets

(56) References Cited

U.S. PATENT DOCUMENTS

| | | | | |
|---|---|---|---|---|
| 2008/0022099 A1* | 1/2008 | Kawano | ............... | G06F 21/6263 713/168 |
| 2009/0228978 A1* | 9/2009 | Cooley | ................... | G06F 21/31 726/19 |
| 2014/0310792 A1* | 10/2014 | Hyland | ............... | H04L 63/0815 726/8 |
| 2015/0163377 A1* | 6/2015 | Ge | ....................... | H04N 1/4426 358/1.14 |

* cited by examiner

| FUNCTION | STORAGE SITE |
|---|---|
| LOGIN | CLOUD |
| FUNCTION A | DEVICE |
| FUNCTION B | NOT STORED |

INFORMATION PROCESSING SYSTEM AND NON-TRANSITORY COMPUTER READABLE MEDIUM FOR ACCESS PERMISSION CONTROL

CROSS-REFERENCE TO RELATED APPLICATIONS

This application is based on and claims priority under 35 USC 119 from Japanese Patent Application No. 2019-050169 filed Mar. 18, 2019.

BACKGROUND

(i) Technical Field

The present disclosure relates to an information processing system and a non-transitory computer readable medium.

(ii) Related Art

Japanese Unexamined Patent Application Publication NO. 2010-134602 discloses a session management apparatus including a unit that stores terminal identification information for specifying a user terminal; a unit that generates a session ID and transmits a uniform resource locator (URL) including the session ID to a user terminal; and a unit that, every time a request using a URL including the session ID is received from a user terminal, confirms terminal identification information received from the user terminal, responds to the request from the user terminal if the received terminal identification information matches the stored terminal identification information, and refuses the request if the received terminal identification information does not match the stored terminal identification information.

Japanese Unexamined Patent Application Publication NO. 2013-029907 discloses a login management server for an image forming apparatus. The login management server is disposed so as to be capable of communicating with an image forming apparatus and permits login to the image forming apparatus using user information, which is identification information of a user. The login management server includes a request receiving unit that receives a request for login to the image forming apparatus with the user information; an authentication unit that performs authentication in response to the request received by the request receiving unit; a login unit that determines whether or not to permit the requested login for which the authentication by the authentication unit has succeeded; a permitted login recording unit that that records the login permitted by the login unit; and a permission combination setting unit that sets a combination of types of the request for multiple-logins-with-identical-information so that the multiple-logins-with-identical-information is permitted, the multiple-logins-with-identical-information being multiple logins to the image forming apparatus using the identical user information. In a case where a former-login-with-identical-information, which is a former login in the multiple-logins-with-identical-information, is recorded by the permitted login recording unit and in a case where a combination of a type of the request for the former-login-with-identical-information and a type of the request for a latter-login-with-identical-information, which is a latter login in the multiple-logins-with-identical-information, is set by the permission combination setting unit, the login unit permits both the former-login-with-identical-information and the latter-login-with-identical-information.

SUMMARY

An information processing system includes plural information processing devices. Each of the plural information processing devices is accessible using first authentication information that is given to each of users, that varies among the users, and that is common to the plural information processing devices. In the information processing system, access to a specific service from an accessed information processing device among the plural information processing devices is permitted using second authentication information that is given for the specific service to each of the users and that varies among the users.

Aspects of non-limiting embodiments of the present disclosure relate to an information processing system and a non-transitory computer readable medium in which, in a case where access to a specific service from one of plural information processing devices that are accessible using common first authentication information is permitted, input of second authentication information for accessing the specific service can be skipped when accessing the specific service from another one of the plural information processing devices.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including plural information processing devices each of which is accessible using first authentication information that is given to each of users, that varies among the users, and that is common to the plural information processing devices, access to a specific service from an accessed information processing device among the plural information processing devices being permitted using second authentication information that is given for the specific service to each of the users and that varies among the users. The information processing system includes a display controller and a storage controller. In a case where first access permission information that corresponds to the first authentication information used to access the accessed information processing device and that is for permitting access to the specific service is not stored in a storage unit, the display controller performs control to display an input screen for inputting the second authentication information for accessing the specific service. In a case where the first access permission information is stored in the storage unit and in a case where authentication information input from the input screen matches the second authentication information that is predetermined, the storage controller permits access to the specific service and performs control to cause the storage unit to store new first access permission information for the specific service in association with the first authentication information used to access the accessed information processing device.

BRIEF DESCRIPTION OF THE DRAWINGS

Exemplary embodiments of the present disclosure will be described in detail based on the following figures, wherein.

DETAILED DESCRIPTION

Hereinafter, exemplary embodiments of the present disclosure will be described in detail with reference to the attached drawings.

First Exemplary Embodiment

An information processing system according to this exemplary embodiment includes plural information processing devices used by a user. The user is given first authentication information that is common to the plural information processing devices. The first authentication information is identification information that is given to the user so that the plural information processing devices identify the user. Each of the plural information processing devices permits access to the information processing device when obtaining the first authentication information.

The user is able to use a specific service from an information processing device that the user has accessed. The user is given second authentication information for the specific service. The second authentication information is identification information that is given to the user so that the user is identified for the specific service. The information processing system permits access to the specific service when obtaining the second authentication information.

In this exemplary embodiment, the user accesses the specific service by using an application. The application is an abbreviation of a Web application. The application is application software that is operated on a Web browser through a network. The application is operated by the cooperation between a program on the Web browser side and a program on the Web system side. The user installs the program on the Web browser side to an information processing device including a Web browser installed therein, and uses the application.

Configuration of Information Processing System

An example of the configuration of an information processing system will be described.

Figure 1:
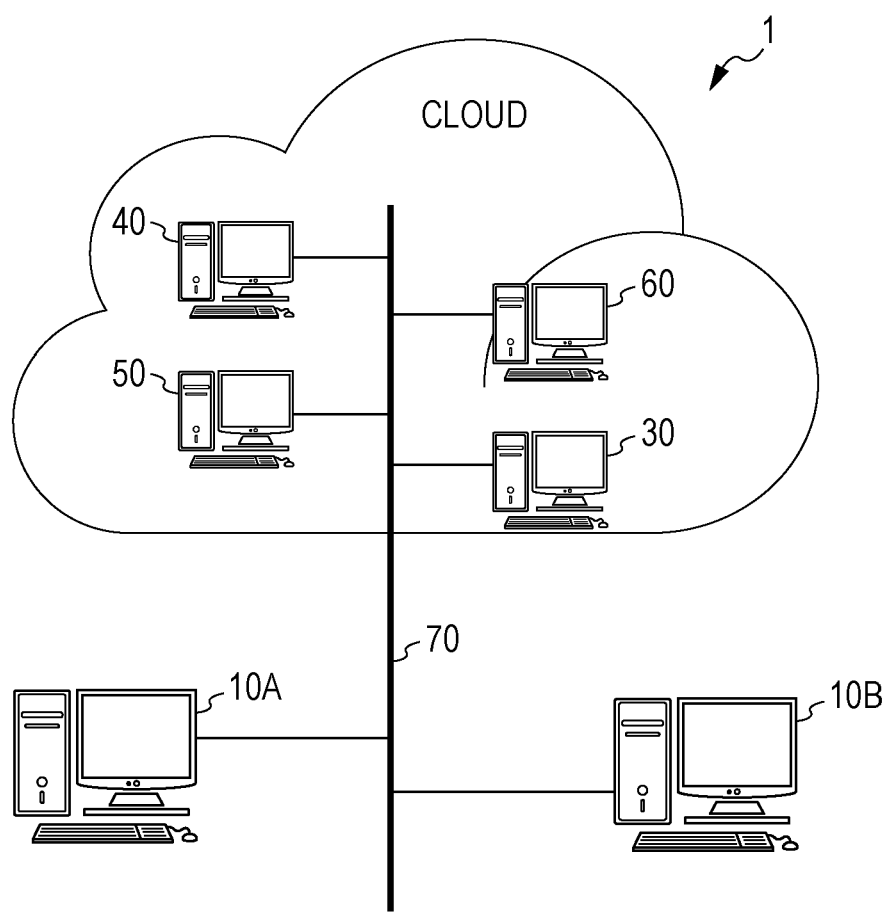
FIG. 1 is a schematic diagram illustrating an example of the configuration of an information processing system according to an exemplary embodiment of the present disclosure.

FIG. 1 is a schematic diagram illustrating an example of the configuration of an information processing system 1 according to an exemplary embodiment of the present disclosure. In this exemplary embodiment, the information processing system 1 includes a device 10A and a device 10B, which are plural information processing devices used by a user. Each of the devices 10A and 10B includes a Web browser 22 installed therein (see FIG. 2). Each of the devices 10A and 10B includes an identical application 24 installed therein (see FIG. 2). A Web system that provides a service of the application 24 is located on the cloud.

In this exemplary embodiment, the information processing system 1 includes the Web system that provides the service of the application 24. The Web system provides an application programming interface (API) to the application 24. The Web system includes, for example, a request receiving unit 30, a token issuing unit 40, a service unit 50, and a token storage unit 60. Each unit of the Web system is a server that provides a service of the unit.

The request receiving unit 30 receives a request from the application 24, which is a Web client, and requests a unit concerned of the Web system to perform processing. The unit concerned performs the requested processing and provides a result of the processing to the application 24. The service unit 50 provides a service of the application 24. The token issuing unit 40 issues a token to be used to access the service unit 50. The token storage unit 60 stores the token issued by the token issuing unit 40.

Each of the devices 10A and 10B is connected to the individual units of the Web system through a communication line 70. Hereinafter, each of the devices 10A and 10B will be referred to as a device 10 when it is not necessary to distinguish them from each other.

In this exemplary embodiment, the information processing system 1 controls access to the service unit 50 by using a token issued by the token issuing unit 40. From this point of view, the authorization mechanism of the information processing system 1 is similar to the authorization mechanism of OAuth 2.0 defined by RFC 6749.

A token is an example of access permission information for permitting access to a service. The access permission information is expressed by a character string. In this exemplary embodiment, a description will be given of an example in which two types of tokens, an access token and a refresh token, are used. Hereinafter, an access token is abbreviated as an "A-token", and a refresh token is abbreviated as an "R-token".

The A-token and the R-token are defined by OAuth 2.0. In this exemplary embodiment, the A-token is a token that is used to directly access the service unit 50. The R-token is a token that is used to have the token issuing unit 40 issue the A-token.

The A-token includes a right to access a service (scope). For example, an access right common to plural applications in a device is given. The A-token has a short effective period of, for example, 15 minutes. The R-token does not have an effective period or has an effective period longer than that of the A-token.

The token issuing unit 40 issues an R-token when issuing an A-token. The R-token is stored in the token storage unit

60. When the effective period of the A-token has expired, a new A-token is obtained by using the R-token.

Configuration of Device

Figure 2:
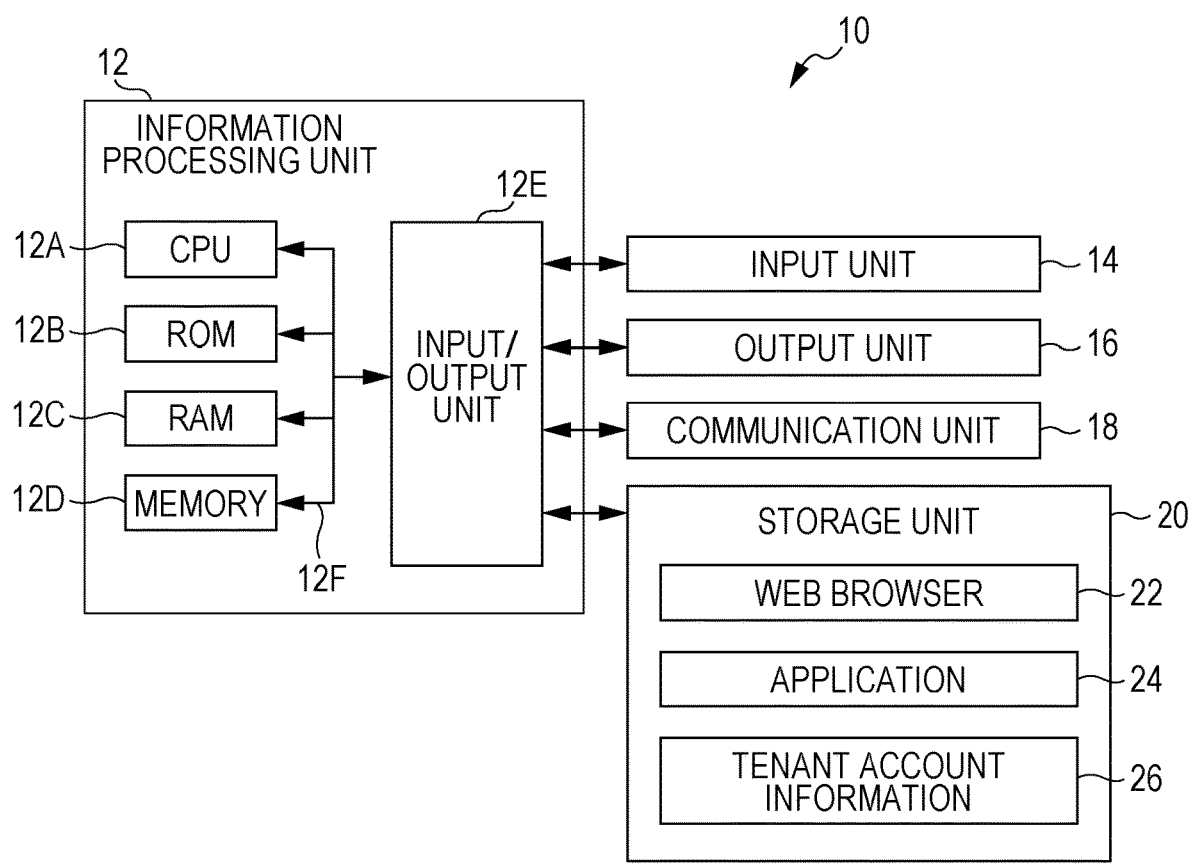
FIG. 2 is a block diagram illustrating an example of the electrical configuration of a device.

FIG. 2 is a block diagram illustrating an example of the electrical configuration of the device 10.

The device 10 includes an information processing unit 12, which is a computer that controls the entire device and performs various computations. The information processing unit 12 includes a central processing unit (CPU) 12A, a read only memory (ROM) 12B storing various programs, a random access memory (RAM) 12C used as a work area during execution of a program, a nonvolatile memory 12D, and an input/output unit 12E. The CPU 12A, the ROM 12B, the RAM 12C, the memory 12D, and the input/output unit 12E are connected to each other through a bus 12F.

The device 10 also includes an input unit 14, such as a mouse, a keyboard, and the like; an output unit 16, such as a display; a communication unit 18, which is an interface for communicating with an external device; and a storage unit 20, which is an external storage device, such as a hard disk. The input unit 14, the output unit 16, the communication unit 18, and the storage unit 20 are connected to the input/output unit 12E. The information processing unit 12 transmits information to and receives information from these units and controls these units.

The storage unit 20 stores the Web browser 22, the application 24, tenant account information 26, and so forth. The application 24 is a program on the Web browser side. Various programs and various data may be stored in another storage device that is inside or outside the device 10, or may be recorded on a recording medium, such as a compact disc-read only memory (CD-ROM). Alternatively, the various programs and various data may be obtained through communication.

Configuration of Server

Each of the request receiving unit 30, the token issuing unit 40, the service unit 50, and the token storage unit 60 included in the Web system is a server that provides a service. Here, the electrical configuration of the request receiving unit 30 will be described. The electrical configurations of the servers are identical to each other, and thus the electrical configurations of the token issuing unit 40, the service unit 50, and the token storage unit 60 will not be described.

Figure 3:
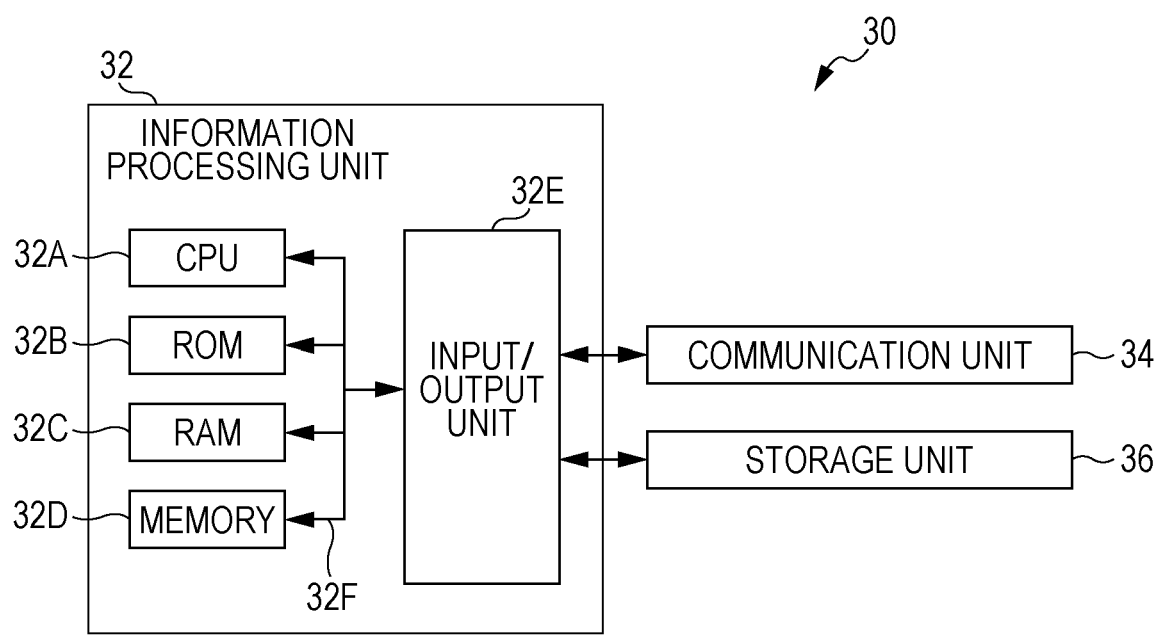
FIG. 3 is a block diagram illustrating an example of the electrical configuration of a request receiving unit.

FIG. 3 is a block diagram illustrating an example of the electrical configuration of the request receiving unit 30.

The request receiving unit 30 includes an information processing unit 32, which is a computer that controls the entire device and performs various computations. The information processing unit 32 includes a CPU 32A, a ROM 32B storing various programs, a RAM 32C used as a work area during execution of a program, a nonvolatile memory 32D, and an input/output unit 32E. The CPU 32A, the ROM 32B, the RAM 32C, the memory 32D, and the input/output unit 32E are connected to each other through a bus 32F.

The request receiving unit 30 also includes a communication unit 34, which is an interface for communicating with an external device; and a storage unit 36, which is an external storage device, such as a hard disk. The communication unit 34 and the storage unit 36 are connected to the input/output unit 32E. The information processing unit 32 transmits information to and receives information from these units and controls these units.

Screen Transition

Next, the outline of this exemplary embodiment will be described with reference to a screen transition diagram.

Figure 4:
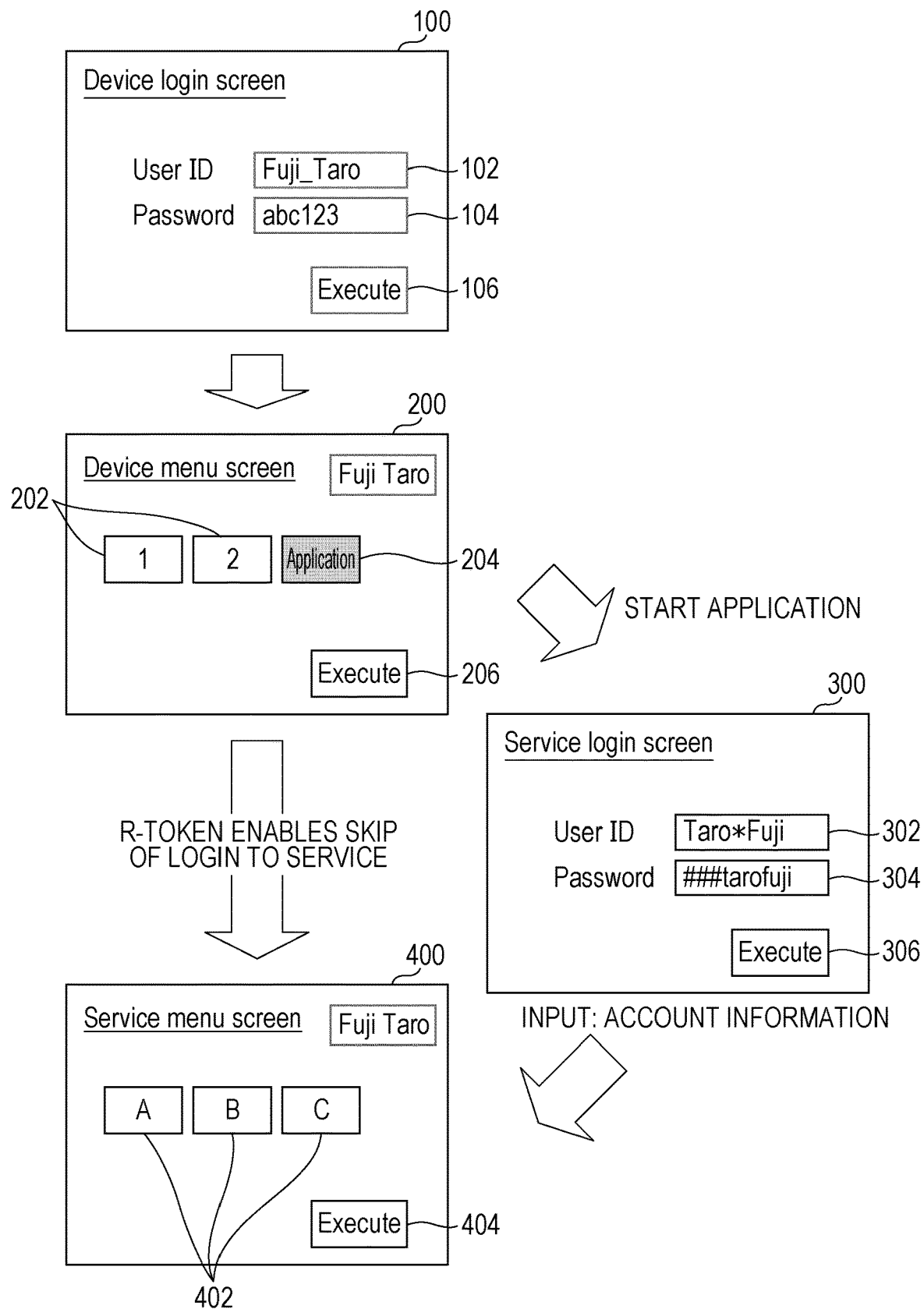
FIG. 4 is a screen transition diagram of the information processing system according to a first exemplary embodiment.

FIG. 4 is a screen transition diagram of the information processing system 1 according to the first exemplary embodiment.

Login to Device

First, a user makes the device 10 available.

The user is given in advance device login information as first authentication information. The device login information is information common to plural devices 10. The device login information is information with which each of the plural devices 10 identifies the user. The device 10 presents a device login screen 100 to the user and receives input of the device login information from the user. The device login information includes a user ID and password for logging in to the device 10. In a case where the device 10 includes a card authentication unit, card authentication may be performed in which the device login information is read from an IC card or the like possessed by the user.

In the example illustrated in FIG. 4, the device login screen 100 includes an input field 102, an input field 104, and an instruction field 106. The input field 102 is a field in which the user ID for logging in to the device 10 is to be input. The input field 104 is a field in which the password for logging in to the device 10 is to be input. The instruction field 106 is a button for providing an instruction for execution. The device 10 starts authentication processing in response to input of the user ID and password and an instruction for execution.

If the information obtained from the user matches predetermined device login information, the device 10 permits the user to access the device 10. The device login information is stored in the storage device of the device 10. The device 10 presents a device menu screen 200 for selecting a function to the user and receives a selection of a function from the user.

In the example illustrated in FIG. 4, the device menu screen 200 includes a selection field 202, an application selection field 204, and an instruction field 206. The selection field 202 includes buttons for selecting a function of the device 10. The application selection field 204 is a button for selecting an application. The instruction field 206 is a button for providing an instruction for execution. The application is started in response to the selection of the application and an instruction for execution. Here, it is assumed that the application that is started is an "application A".

Login to Service

Next, the user makes a service provided by the application A available.

The user is given in advance account information as second authentication information that is specific to the application A. The account information is identification information with which the application identifies the user. The account information may be registered in advance by the user. The information processing system 1 presents a service login screen 300 to the user and receives input of the account information from the user. The account information includes a user ID and password for the service.

In the example illustrated in FIG. 4, the service login screen 300 includes an input field 302, an input field 304, and an instruction field 306. The input field 302 is a field in which the user ID for the service is to be input. The input field 304 is a field in which the password for the service is to be input. The instruction field 306 is a button for providing an instruction for execution. The information processing system 1 starts authentication processing in response to input of the user ID and password and an instruction for execution.

If the information obtained from the user matches predetermined account information, the information processing system 1 permits the user to access the service. The information processing system 1 presents a service menu screen 400 for selecting a function of the service to the user, and receives a selection of a function from the user.

In the example illustrated in FIG. 4, the service menu screen 400 includes a selection field 402 and an instruction field 404. The selection field 402 includes buttons for selecting a function of the service. The instruction field 404 is a button for providing an instruction for execution. The information processing system 1 permits access to a function of the service in response to the selection of the function of the service and an instruction for execution.

In this exemplary embodiment, when the application A is started, the information processing system 1 first obtains the device login information. The information processing system 1 then determines whether or not there is an R-token associated with the device login information. As will be described below, every time the user accesses a service, an R-token is stored in the token storage unit 60 on the cloud. In a case where the user uses the same application A by using plural devices 10, the R-token associated with the device login information is obtained if the user has logged in to the application A by using any one of the devices 10.

In a case where the R-token can be obtained, the information processing system 1 presents the service menu screen 400 to the user and permits the user to access the service. In the case where the R-token can be obtained, the procedure of logging in to the service provided by the application A, such as display of the service login screen 300 and input of the account information, is skipped.

Operation of Information Processing System

Next, the operation of the information processing system 1 performed after the application has been started will be described.

The operation of the application 24 corresponds to the processing procedure of the program on the Web browser side, whereas the operations of the request receiving unit 30, the token issuing unit 40, the service unit 50, and the token storage unit 60 correspond to the processing procedure of the program on the Web system side (see FIG. 1).

The token issuing unit 40 stores account information. The token storage unit 60 stores an R-token in association with device login information, as will be described below. As described above, the device login information is stored in the storage device of the device 10.

The Web browser and the Web system communicate with each other by using an HTTP protocol. The Web browser transmits an HTTP request describing details of a request to the Web system. The Web system processes the request and transmits an HTTP response describing a processing result to the Web browser.

Each of the HTTP request and the HTTP response includes a header and a body. The header includes information indicating the type of software used for communication, a data format, a language, and so forth. The body includes a message or the like to be transmitted. A token and authentication information are included in the header of the HTTP request.

Hereinafter, a description will be given of the operation of the information processing system 1 performed after the application has been started, regarding both cases where an R-token is not obtainable and where an R-token is obtainable.

Case where R-Token is not Obtainable

Figure 5:
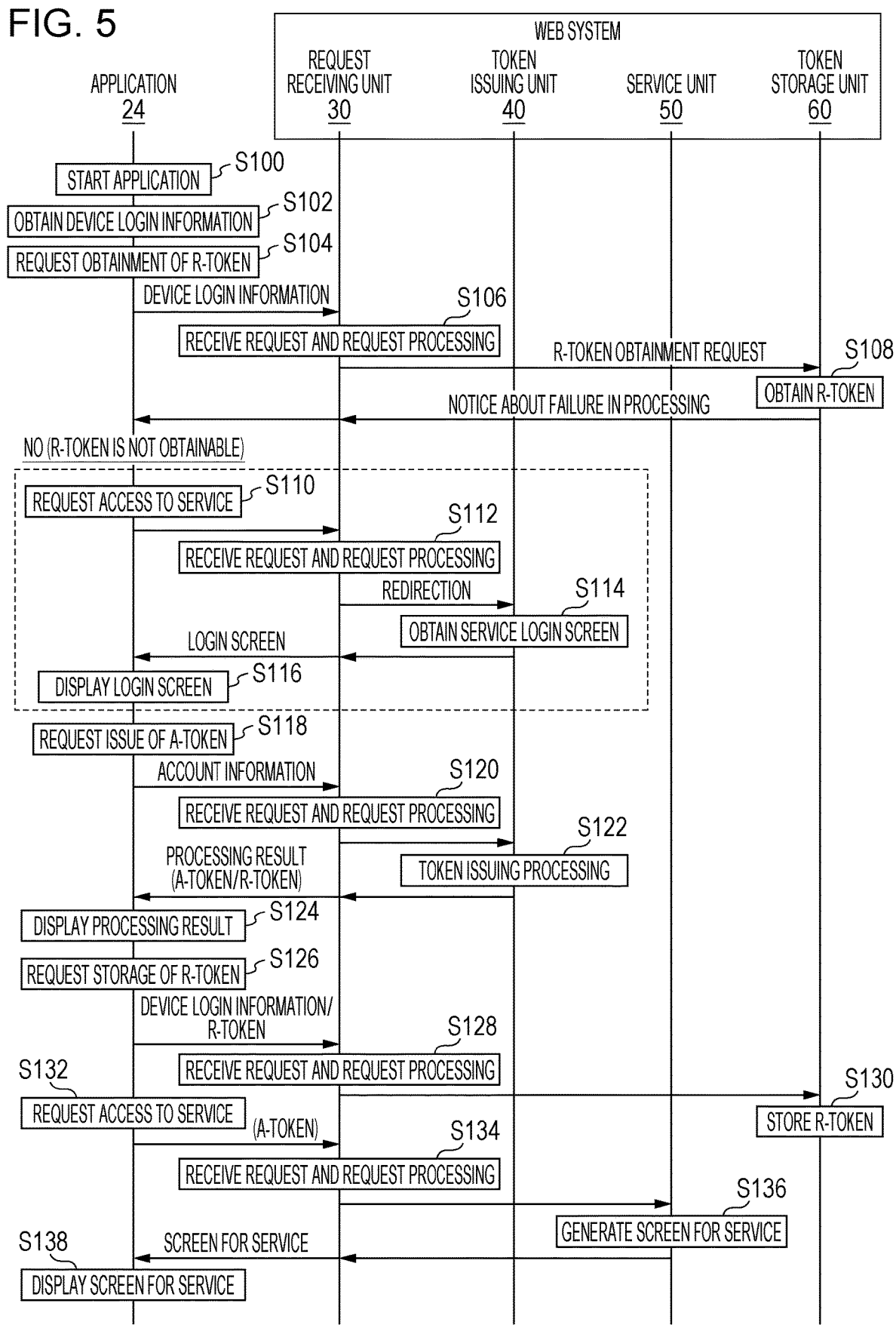
FIG. 5 is a sequence diagram illustrating an example of the operation of the information processing system according to the first exemplary embodiment.

FIG. 5 is a sequence diagram illustrating an example of the operation of the information processing system 1 according to the first exemplary embodiment. When an R-token is not stored in the token storage unit 60, for example, when the user uses the application A for the first time, the R-token is not obtainable.

In step S100, the application 24 is started in response to an instruction to start the application 24 from the user. In step S102, the application 24 obtains device login information from the storage device of the device 10. In step S104, the application 24 transmits an HTTP request requesting the obtainment of an R-token to the Web system. The HTTP request includes the device login information in the header thereof.

In step S106, the request receiving unit 30 receives the R-token obtainment request and requests the token storage unit 60 to obtain the R-token. In step S108, the token storage unit 60 performs R-token obtainment processing. The token storage unit 60 extracts the R-token on the basis of the device login information. Here, a description will be given of a case where the R-token is not obtainable. In a case where the R-token is not extracted, the token storage unit 60 transmits an HTTP response to the application 24 to notify the application 24 that the extraction has failed.

The token storage unit 60 stores tokens by using a key-value scheme in which keys and values are associated with each other, with device login information or information generated from the device login information being used as a keyword. In the key-value scheme, keys and values are associated with each other in a one-to-one relationship, and there is no duplication in the combination of a keyword and a token. The token storage unit 60 generates a keyword from the device login information and extracts the R-token corresponding to the generated keyword by using the key-value scheme.

The keyword is, for example, a first character string representing a user ID for logging in to the device 10, a second character string representing a password for logging in to the device 10, a third character string obtained by combining the first character string and the second character string, a hash value obtained from each character string by using a hash function, or the like.

In step S110, the application 24 transmits an HTTP request requesting access to a service to the Web system. In step S112, the request receiving unit 30 receives the service access request and requests, by redirection, the token issuing unit 40 to perform processing. That is, the request receiving unit 30 first requests the token issuing unit 40, not the service unit 50, to perform processing.

In step S114, the token issuing unit 40 obtains a service login screen (see FIG. 4) and transmits an HTTP response including the screen data to the application 24. In step S116, the application 24 displays the service login screen and receives input of account information from the user. After the account information has been input and an instruction for execution has been provided, the processing proceeds to step S118.

In step S118, the application 24 transmits an HTTP request requesting issue of an A-token that is necessary to access the service to the Web system, in response to an instruction from the user. The HTTP request includes the account information in the header thereof.

In step S120, the request receiving unit 30 receives the token issue request and requests the token issuing unit 40 to perform processing. In step S122, the token issuing unit 40 performs token issuing processing. The token issuing unit 40 performs authentication by using the account information. If the information obtained from the user matches account information stored in advance, the token issuing unit 40 issues an A-token and a new R-token. The token issuing unit 40 transmits an HTTP response including a processing result to the application 24.

In a case where the A-token is issuable, that is, in a case where the authentication has succeeded, the processing result includes the A-token and R-token issued by the token issuing unit 40. In a case where the A-token is not issuable, that is, in a case where the authentication has failed, the processing result includes the screen data of a screen indicating that the authentication has failed.

In a case where the authentication has failed, the processing proceeds to step S124. In step S124, the application 24 displays, as the processing result, the screen indicating that the authentication has failed, and prompts the user to input the account information again. In a case where the authentication has succeeded, step S124 is skipped, and the processing proceeds to step S126.

In step S126, the application 24 transmits an HTTP request requesting storage of the new R-token to the Web system. The HTTP request includes the device login information and the new R-token.

In step S128, the request receiving unit 30 receives the R-token storage request and requests the token storage unit 60 to perform processing. In step S130, the token storage unit 60 stores the new R-token in association with the device login information.

In step S132, the application 24 transmits an HTTP request requesting access to the service to the Web system. The HTTP request includes the A-token in the header thereof. In step S134, the request receiving unit 30 receives the service access request and requests the service unit 50 to perform processing.

In step 136, the service unit 50 determines whether or not the received A-token is correct. For example, the service unit 50 decodes the received A-token by using as a key another character string included in the header of the HTTP request. In a case where a predetermined character string is obtained, the service unit 50 determines that the received A-token is correct.

In a case where the service unit 50 determines that the received A-token is correct, the service unit 50 permits access to the service and performs processing of generating a screen for the service. The service unit 50 obtains a service menu screen (see FIG. 4) and transmits an HTTP response including the screen data to the application 24.

In step S138, the application 24 displays the service menu screen and receives a selection of a service function from the user.

In a case where the received A-token is not correct, the service unit 50 obtains the screen data of a screen indicating that access to the service has failed, and transmits an HTTP response including the screen data to the application 24. The application 24 displays, as the processing result, the screen indicating that access to the service has failed, and prompts the user to perform access again.

Case where R-Token is Obtainable

Figure 6:
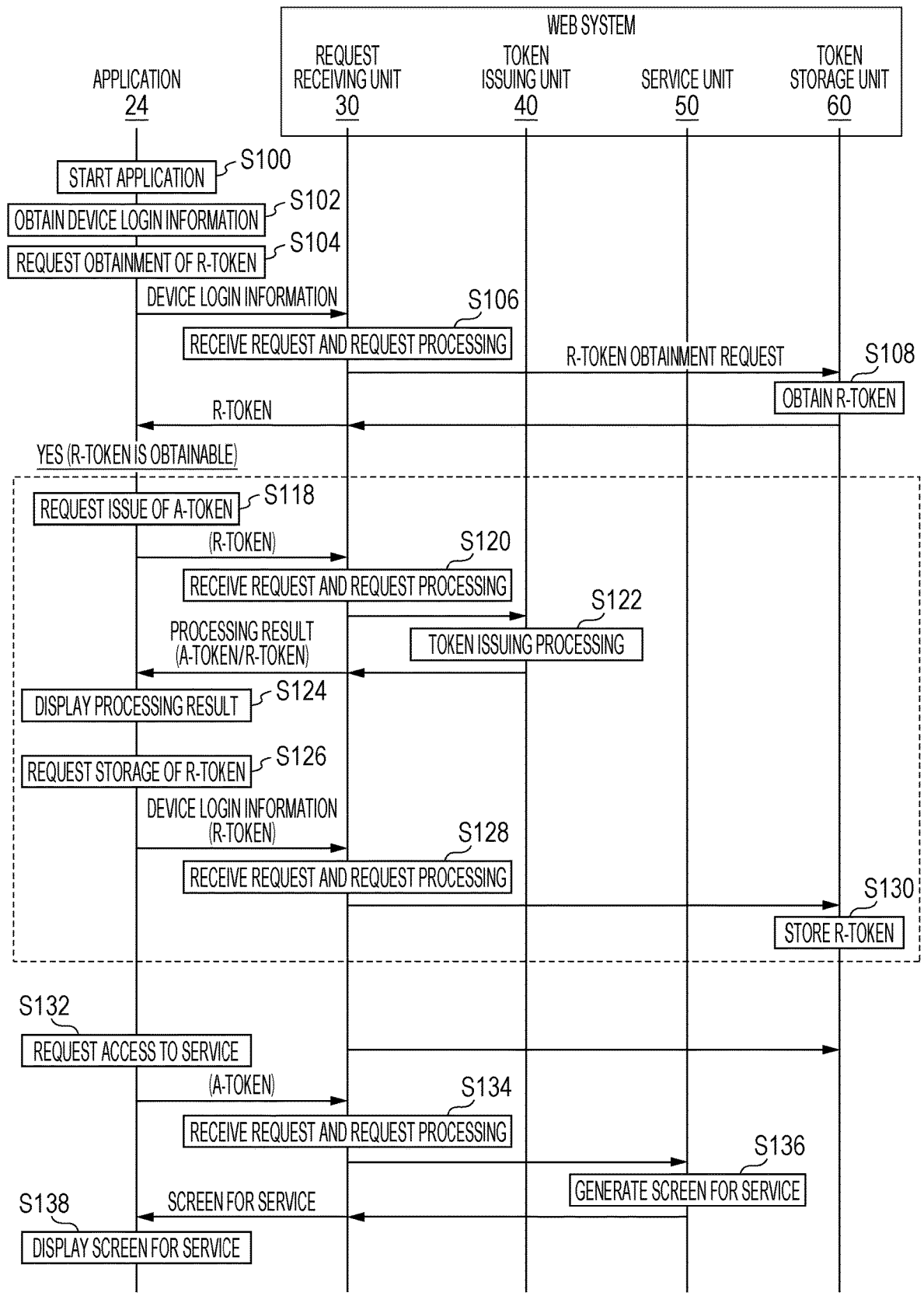
FIG. 6 is a sequence diagram illustrating an example of the operation of the information processing system according to the first exemplary embodiment.

FIG. 6 is a sequence diagram illustrating an example of the operation of the information processing system 1 according to the first exemplary embodiment. In a case where the user has used the application A from an identical device or a different device, an R-token is stored in the token storage unit 60, and thus the R-token is obtainable.

The operation illustrated in FIG. 6 is the same as that illustrated in FIG. 5 except that steps S110 to S116 are not included, and thus only the difference will be described.

In the operation illustrated in FIG. 5, the token storage unit 60 is unable to extract the R-token in step S108. In contrast, in the operation illustrated in FIG. 6, the token storage unit 60 is able to extract the R-token in step S108. The token storage unit 60 transmits an HTTP response including the R-token to the application 24.

In a case where the R-token is obtainable as illustrated in FIG. 6, the procedure from step S110 to step S116, that is, the procedure of displaying the service login screen and receiving input of account information from the user, is skipped.

In step S118, the application 24 transmits an HTTP request requesting issue of an A-token that is necessary to access the service to the Web system, in response to an instruction from the user. The HTTP request includes the R-token in the header thereof.

In step S120, the request receiving unit 30 receives the token issue request and requests the token issuing unit 40 to perform processing. In step S122, the token issuing unit 40 performs token issuing processing.

The token issuing unit 40 determines whether or not the received R-token is correct. In a case where the token issuing unit 40 determines that the received R-token is correct, the token issuing unit 40 issues an A-token and a new R-token. The token issuing unit 40 transmits an HTTP response including a processing result to the application 24.

In this exemplary embodiment, a description has been given of an example in which an R-token is stored in the token storage unit 60. In a case where the effective period of an A-token is long, the A-token may be stored in the token storage unit 60.

In this case, the A-token is obtained in the processing from step S110 to step S116 in FIGS. 5 and 6. The processing from step S118 to step S124 in FIGS. 5 and 6 is skipped. The processing proceeds from step S116 to step S126. The A-token is stored in step S126 to step S130 in FIGS. 5 and 6.

Second Exemplary Embodiment

In a second exemplary embodiment, tenant account information is registered in advance in an application. The tenant account information is an organization account that is given to users belonging to an organization in a case where the organization, such as a company, uses the application. The tenant account information includes an ID and password of the organization account.

When a user installs the application, the user is given in advance the tenant account information as third authentication information. The tenant account information is stored in the storage device of the device 10 used by the user, and is also stored in the storage device of the token issuing unit 40 on the cloud.

In this exemplary embodiment, a token for a tenant account (hereinafter referred to as a "tenant token") is necessary to access the token storage unit 60. The application obtains the tenant token and accesses the token storage unit 60 by using the obtained tenant token. With use of the tenant token, access to the token storage unit 60 is securely performed.

Operation of Information Processing System

Next, the operation of the information processing system 1 will be described.

Figure 7:
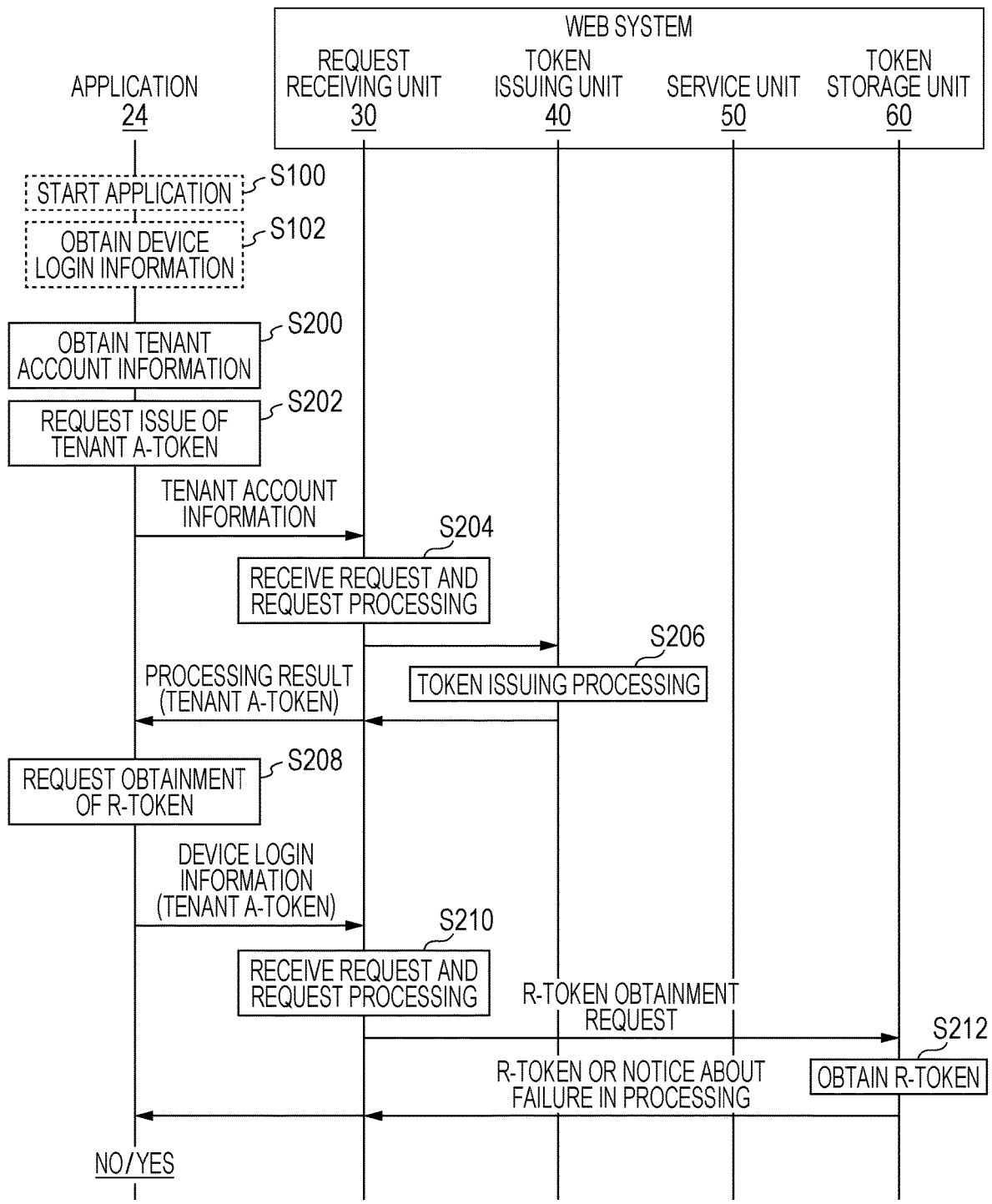
FIG. 7 is a sequence diagram illustrating an example of the operation of the information processing system according to a second exemplary embodiment.
Figure 8:
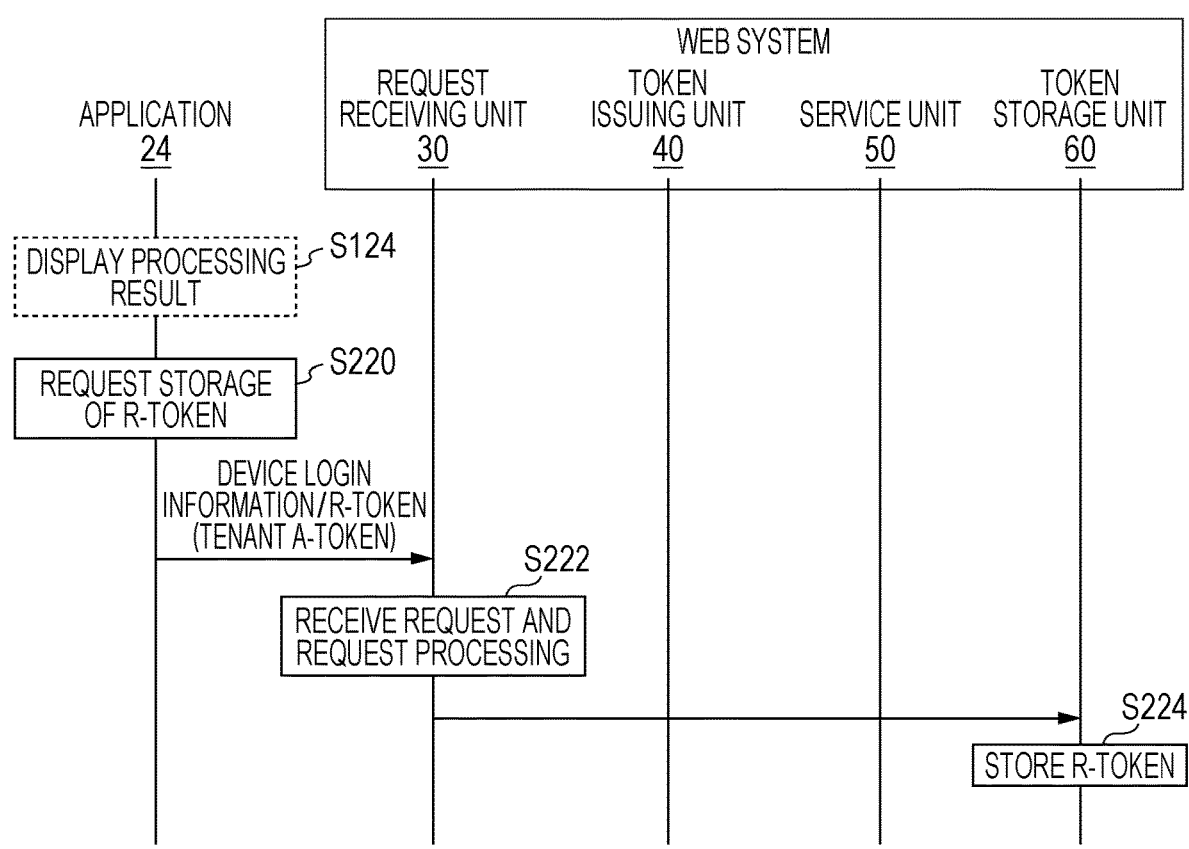
FIG. 8 is a sequence diagram illustrating an example of the operation of the information processing system according to the second exemplary embodiment.

FIGS. 7 and 8 are sequence diagrams illustrating an example of the operation of the information processing system 1 according to the second exemplary embodiment.

Obtainment of Token

When obtaining a token, a tenant token is used. The procedure from step S104 to step S108 in FIGS. 5 and 6 is replaced with the procedure from step S200 to step S212 in FIG. 7. The other procedure is the same as that in FIGS. 5 and 6, and thus the illustration and description thereof will not be given.

In step S100, the application 24 is started in response to an instruction to start the application 24 from the user. In step S102, the application 24 reads the device login information stored in the storage device of the device 10 to obtain the device login information.

In step S200, the application 24 obtains the tenant account information from the storage device of the device 10. In step S202, the application 24 transmits an HTTP request requesting issue of a tenant A-token to the Web system. The HTTP request includes the tenant account information in the header thereof.

In step S204, the request receiving unit 30 receives the token issue request and requests the token issuing unit 40 to issue the token. In step S206, the token issuing unit 40 performs token issuing processing. The token issuing unit 40 performs authentication by using the tenant account information. In a case where the information obtained from the user matches tenant account information stored in advance, the token issuing unit 40 issues a tenant A-token.

The token issuing unit 40 transmits an HTTP response including a processing result to the application 24. The HTTP response includes the tenant A-token.

In step S208, the application 24 transmits an HTTP request requesting obtainment of an R-token to the Web system. The HTTP request includes the tenant A-token in the header thereof and includes the device login information in the body thereof.

In step S210, the request receiving unit 30 receives the token obtainment request and requests the token storage unit 60 to obtain the token. In step S212, the token storage unit 60 performs R-token obtainment processing. First, the token storage unit 60 determines whether or not the received tenant A-token is correct.

In a case where the token storage unit 60 determines that the received tenant A-token is correct, the token storage unit 60 extracts an R-token on the basis of the device login information. In a case where the R-token is extracted, the token storage unit 60 transmits an HTTP response including the R-token to the application 24. In a case where the R-token is not extracted, the token storage unit 60 transmits an HTTP response to the application 24 to notify the application 24 that the extraction has failed.

Storage of Token

When storing a token, a tenant token is used.

The procedure from step S126 to step S130 in FIGS. 5 and 6 is replaced with the procedure from step S220 to step S224 in FIG. 8. The other procedure is the same as that in FIGS. 5 and 6, and thus the illustration and description thereof will not be given.

In step S220, the application 24 transmits an HTTP request requesting storage of the R-token to the Web system. The HTTP request includes the tenant A-token in the header thereof, and includes the device login information and the R-token in the body thereof.

In step S222, the request receiving unit 30 receives the R-token storage request and requests the token storage unit 60 to perform processing. In step S224, the token storage unit 60 determines whether or not the received tenant A-token is correct. In a case where the token storage unit 60 determines that the received tenant A-token is correct, the token storage unit 60 stores the R-token in association with the device login information.

Third Exemplary Embodiment

In a third exemplary embodiment, after access to a service has been permitted, permission for access to each function of the service is necessary. The storage site of a token is changed in accordance with the security level of a function of the service. As the security level increases, access to the storage site of a token is limited more. In the first exemplary embodiment, tokens are stored in the token storage unit 60. In contrast, in the third exemplary embodiment, the storage site of tokens is changed for each function.

Figures 11, 12:
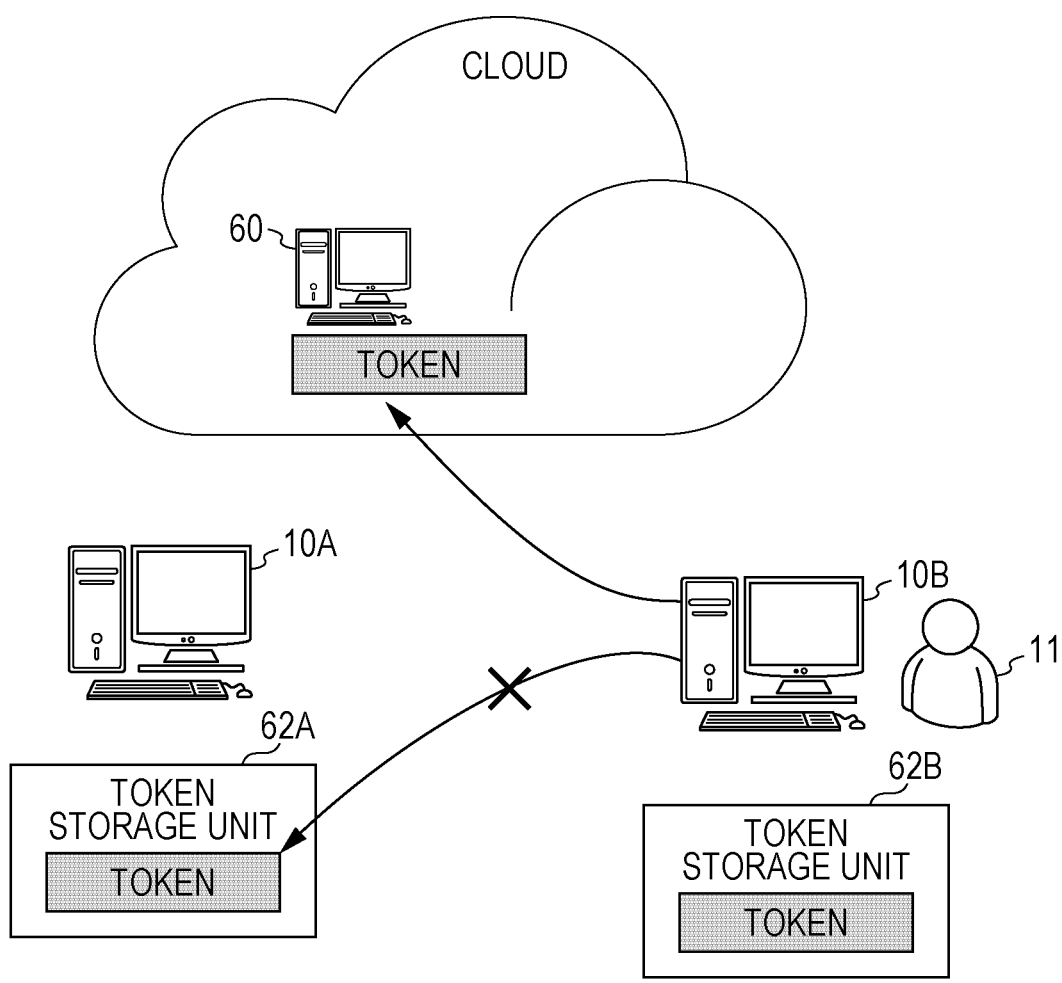
FIG. 11 illustrates an example of a table storing token storage sites for individual functions.
FIG. 12 is a diagram for describing differences in security level among token storage sites.

FIG. 11 illustrates an example of a table storing token storage sites for individual functions. In this exemplary embodiment, an R-token is stored in association with device login information that is used to access the device 10. This table is stored in the storage device of the request receiving unit 30 on the cloud. A manager of the service may change the security levels of the individual functions by rewiring this table.

In the example illustrated in FIG. 11, the storage site of an R-token for login to a service is "cloud", the storage site of an R-token for a function A is "device", and an R-token for function B is "not stored". In a case where a token is not stored, there is no possibility that a token will be stolen, which is the most secure.

FIG. 12 is a diagram for describing differences in security level among storage sites of tokens. A description will be given of a case where a user 11 stores a token by using the device 10A and then obtains the token by using the device 10B.

In a case where the storage site is "cloud", the user 11 obtains the token from the token storage unit 60 on the cloud. In a case where the storage site is "cloud", the user 11 is able to access the storage site from any device 10 used by the user 11. In a case where the storage site is "device", the user 11 is able to obtain the token stored in a token storage unit 62B of his/her device (device 10B) but is not able to obtain the token stored in a token storage unit 62A of another device (device 10A). Thus, it is more secure to store the token in the "device" than to store the token on the "cloud".

Screen Transition

Next, the outline of this exemplary embodiment will be described with reference to a screen transition diagram.

Figure 9:
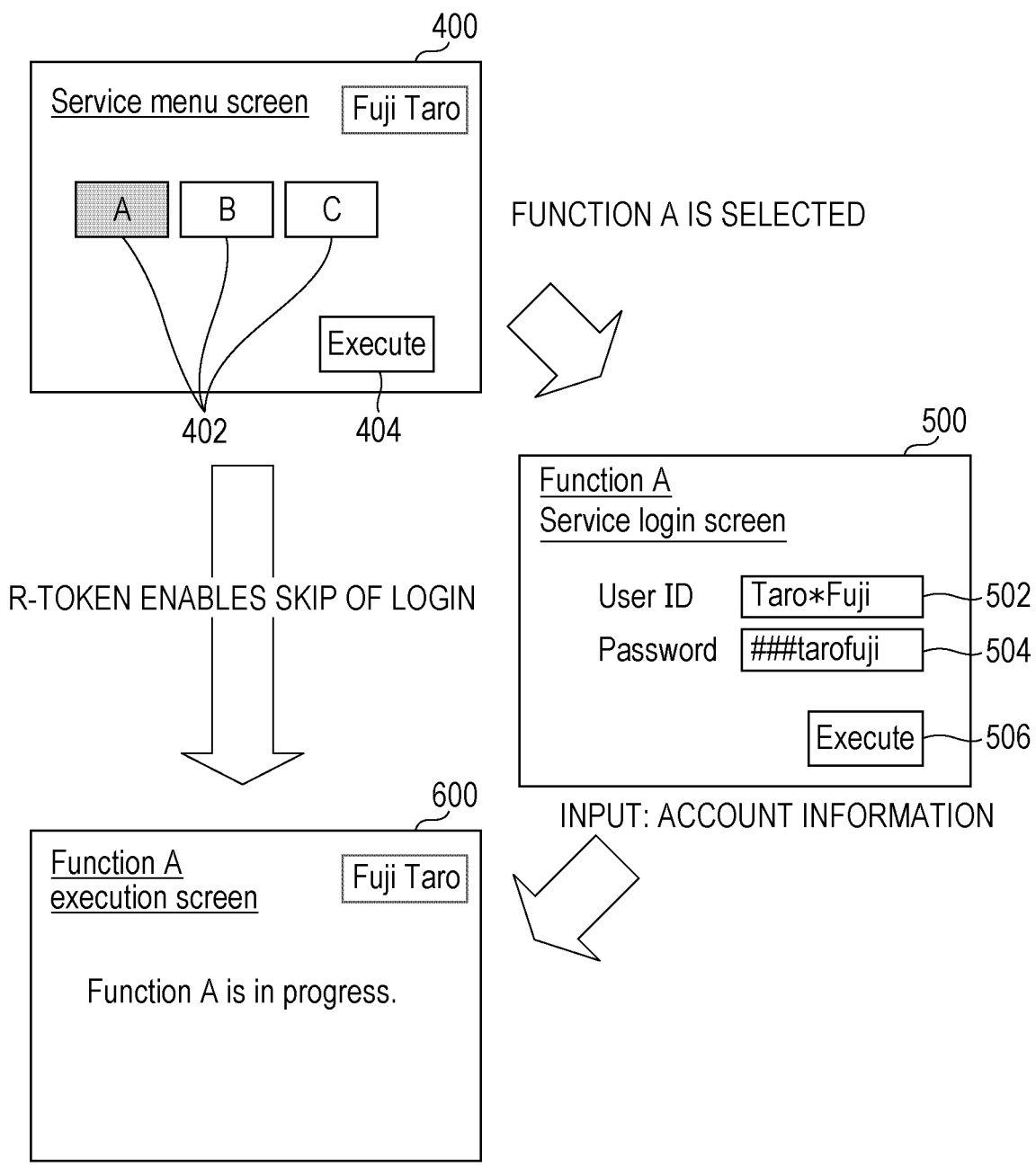
FIG. 9 is a screen transition diagram of the information processing system according to a third exemplary embodiment.

FIG. 9 is a screen transition diagram of the information processing system 1 according to the third exemplary embodiment.

Login to Service

The procedure for displaying the service menu screen 400 is similar to that in the first exemplary embodiment.

An R-token for login is similar to the R-token in the first exemplary embodiment. In this exemplary embodiment, in a case where an R-token for login is obtained when an application is started, the information processing system 1 presents the service menu screen 400 to the user and permits the user to access the service. In this case, the procedure for logging in to the service provided by the application A, such as display of the service login screen 300 (see FIG. 4) and input of account information, is skipped.

Login to Function

Next, the user makes a service function available.

After the function A has been selected on the service menu screen 400 and an instruction for execution has been provided, the information processing system 1 displays a service login screen 500 for the function A. The user is given in advance fourth authentication information for using the function A. Here, the fourth authentication information is the same account information as that for login to the service. The information processing system 1 presents the service login screen 500 for the function A to the user and receives input of account information from the user.

In the example illustrated in FIG. 9, the service login screen 500 for the function A includes an input field 502, an input field 504, and an instruction field 506. The input field 502 is a field in which a user ID for the service is to be input. The input field 504 is a field in which a password for the service is to be input. The instruction field 506 is a button for providing an instruction for execution. The information processing system 1 starts authentication processing in response to input of a user ID and password and an instruction for execution.

In a case where the information obtained from the user matches predetermined account information, the information processing system 1 permits the user to access the function A. The information processing system 1 presents a function A execution screen 600 to the user. The function A execution screen 600 is, for example, a screen indicating that the function A is in progress.

In this exemplary embodiment, when the function A of the service has been used, an R-token for the function A for accessing the function A is stored in the token storage unit 60 on the cloud. In a case where the user uses the same application A by using plural devices 10, the user can obtain the R-token for the function A associated with the device login information if the user has used the function A of the application A by using any of the devices 10.

In a case where the R-token can be obtained, the information processing system 1 presents the service menu screen 400 to the user and permits the user to access the service. In the case where the R-token can be obtained, the procedure for logging in to the service provided by the application A, such as display of the service login screen 300 and input of account information, is skipped.

In this exemplary embodiment, in a case where the R-token for the function A can be obtained when the function A is selected on the service menu screen 400, the information processing system 1 presents the function A execution screen 600 to the user and permits the user to access the service. In this case, the procedure for logging in to the function A, such as display of the service login screen 500 for the function A and input of account information, is skipped in the information processing system 1.

Operation of Information Processing System

Next, the operation of the information processing system 1 will be described.

Operation Before Selection of Function

Figure 10:
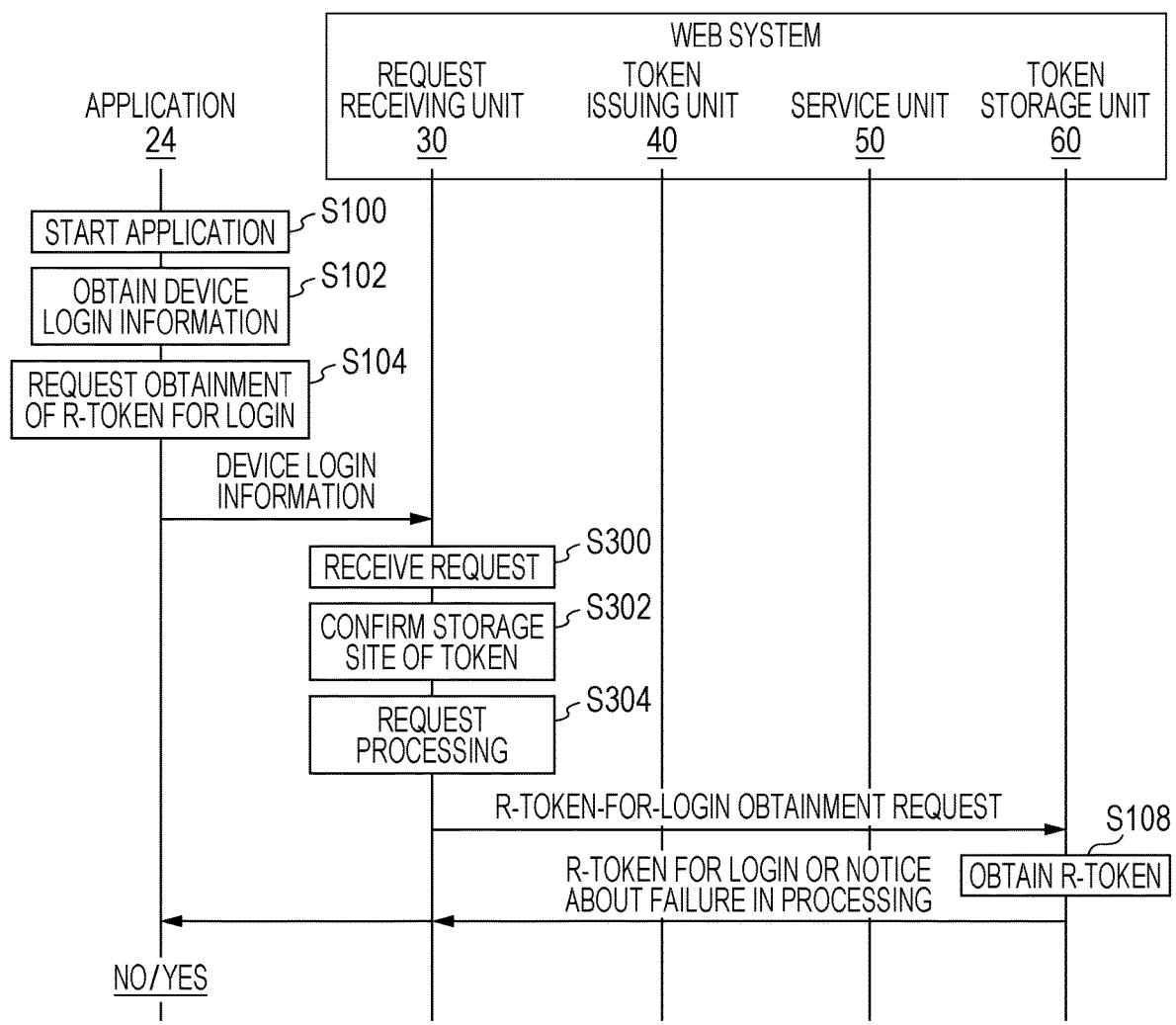
FIG. 10 is a sequence diagram illustrating an example of the operation of the information processing system according to a third exemplary embodiment.

A description will be given of the operation that is performed before the function A is selected on the service menu screen 400 (see FIG. 9). FIG. 10 is a sequence diagram illustrating an example of the operation of the information processing system 1 according to the third exemplary embodiment. The procedure in step S106 in FIGS. 5 and 6 is replaced with the procedure from step S300 to step S304 in FIG. 10. The other procedure is the same as that in FIGS. 5 and 6, and thus the illustration and description thereof will not be given.

In step S100, the application 24 is started in response to an instruction to start the application 24 from the user. In step S102, the application 24 obtains device login information from the storage device of the device 10. In step S104, the application 24 transmits an HTTP request requesting obtainment of an R-token for login to the Web system. The HTTP request includes the device login information in the header thereof.

In step S300, the request receiving unit 30 receives the token obtainment request. In step S302, the request receiving unit 30 refers to the table illustrated in FIG. 11 to confirm the storage site of the R-token for login. The storage site of the R-token for login is the token storage unit 60. In step S304, the request receiving unit 30 requests the token storage unit 60 to obtain the R-token for login.

In step S108, the token storage unit 60 performs R-token obtainment processing. The token storage unit 60 extracts the R-token for login on the basis of the device login information. The token storage unit 60 transmits an HTTP response including an extraction result to the application 24.

Operation after Selection of Function

Figure 13:
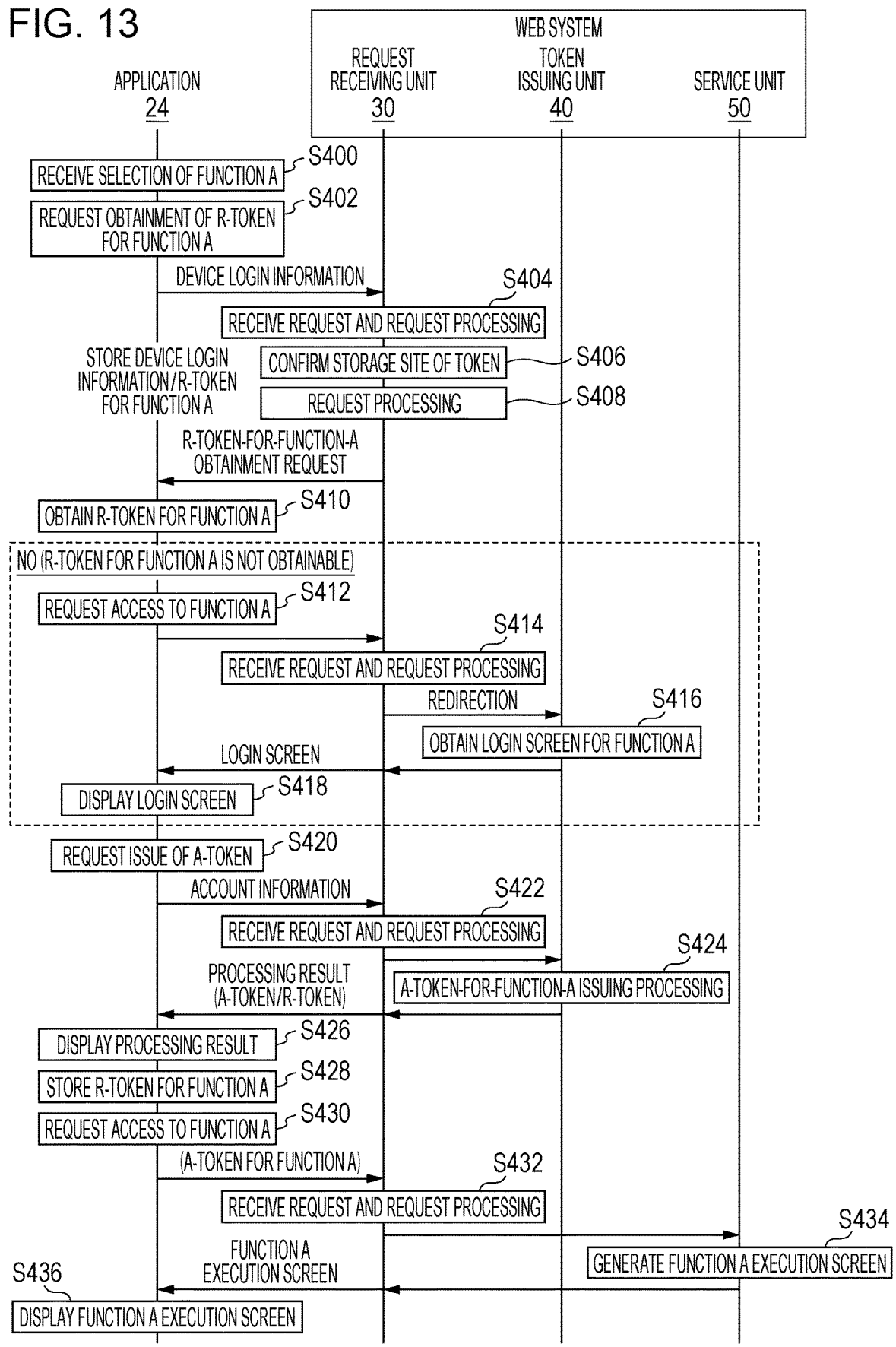
FIG. 13 is a sequence diagram illustrating an example of the operation of the information processing system according to the third exemplary embodiment.

A description will be given of the operation that is performed after the function A has been selected on the service menu screen 400 (see FIG. 9). FIG. 13 is a sequence diagram illustrating an example of the operation of the information processing system 1 according to the third exemplary embodiment. First, a description will be given of the operation in a case where an R-token for the function A is not obtainable.

Case Where R-token is Not Obtainable

In step S400, the application 24 receives a selection of the function A by the user. In step S402, the application 24 transmits an HTTP request requesting obtainment of an R-token for the function A to the Web system. The HTTP request includes device login information in the header thereof. The device login information is already obtained at the time of login.

In step S404, the request receiving unit 30 receives the token obtainment request. In step S406, the request receiving unit 30 refers to the table illustrated in FIG. 11 to confirm the storage site of the R-token for the function A. The storage site of the R-token for the function A is the token storage unit 62 of the device 10 of the user. In step S408, the request receiving unit 30 requests the application 24 to obtain the token. The request receiving unit 30 transmits an HTTP response including information indicating the storage site of the R-token for the function A to the application 24.

In step S410, the application 24 performs R-token-for-function-A obtainment processing. The application 24 accesses the token storage unit 62 of the device 10 and extracts the R-token for the function A on the basis of the device login information. In a case where the R-token for the function A is not obtainable, the application 24 proceeds to step S412.

In step S412, the application 24 transmits an HTTP request requesting access to the function A to the Web system. In step S414, the request receiving unit 30 receives the function access request and requests, by redirection, the token issuing unit 40 to perform processing. That is, the request receiving unit 30 first requests the token issuing unit 40, not the service unit 50, to perform processing.

In step S416, the token issuing unit 40 obtains the service login screen for the function A (see FIG. 9) and transmits an HTTP response including the screen data to the application 24. In step S418, the application 24 displays the service login screen of the function A and receives input of account information from the user. After the account information has been input and an instruction for execution has been provided, the processing proceeds to step S420.

In step S420, the application 24 transmits an HTTP request requesting issue of an A-token for the function A, which is necessary to access the function A, to the Web system. The HTTP request includes the account information in the header thereof.

In step S422, the request receiving unit 30 receives the token issue request and requests the token issuing unit 40 to perform processing. In step S424, the token issuing unit 40 performs A-token-for-function-A issuing processing.

The token issuing unit 40 performs authentication by using the account information. In a case where the information obtained from the user matches account information stored in advance, the token issuing unit 40 issues an A-token for the function A and a new R-token for the function A. The token issuing unit 40 transmits an HTTP response including a processing result to the application 24. The A-token for the function A issued by the token issuing unit 40 is stored in the storage device of the service unit 50.

In a case where the authentication has failed, the processing proceeds to step S426. In step S426, the application 24 displays, as a processing result, a screen indicating that the authentication has failed, and prompts the user to input the account information again. In a case where the authentication has succeeded, step S426 is skipped, and the processing proceeds to step S428.

In step S428, the application 24 stores the new R-token for the function A in the token storage unit 62 of the device 10 in association with the device login information.

In step S430, the application 24 transmits an HTTP request requesting access to the function A to the Web system. The HTTP request includes the A-token for the function A in the header thereof. In step S432, the request receiving unit 30 receives the function access request and requests the service unit 50 to perform processing.

In step S434, the service unit 50 first determines whether or not the received A-token for the function A is correct. In a case where the service unit 50 determines that the received A-token for the function A is correct, the service unit 50 permits access to the function A and performs processing of generating a function A execution screen. The service unit 50 obtains the function A execution screen (see FIG. 9) and transmits an HTTP response including the screen data to the application 24. In step S436, the application 24 displays the function A execution screen (see FIG. 9).

In a case where the received A-token for the function A is not correct, the service unit 50 obtains the screen data of a screen indicating that access to the function A has failed, and transmits an HTTP response including the screen data to the application 24. The application 24 displays, as a processing result, the screen indicating that access to the function A has failed, and prompts the user to perform access again.

Case Where R-token is Obtainable

In a case where the R-token for the function A can be obtained in step S410 in FIG. 13, the procedure from step S412 to step S418 illustrated in FIG. 13 (that is, the procedure for displaying the function login screen and receiving input of account information from the user) is skipped. The header of the HTTP request serving as a token issue request includes the R-token for the function A instead of the account information.

In step S420, the application 24 transmits an HTTP request requesting issue of an A-token for the function A, which is necessary to access the function A, to the Web system in response to an instruction from the user. The HTTP request includes the R-token for the function A in the header thereof.

In step S422, the request receiving unit 30 receives the token issue request and requests the token issuing unit 40 to perform processing. In step S424, the token issuing unit 40 performs token issuing processing.

The token issuing unit 40 determines whether or not the received R-token for the function A is correct. In a case where the token issuing unit 40 determines that the received R-token for the function A is correct, the token issuing unit 40 issues an A-token for the function A and a new R-token for the function A. The token issuing unit 40 transmits an HTTP response including a processing result to the application 24.

In this exemplary embodiment, a description has been given of an example in which the R-token for the function A is stored in the token storage unit 62 of the device 10. In a case where the effective period of the A-token is long, the A-token for the function A may be stored in the token storage unit 62, as in the first exemplary embodiment. In the case of storing the A-token for the function A, a step of obtaining the A-token for the function A by using the R-token for the function A is skipped or changed in the procedure illustrated in FIG. 13.

Modification Examples

The configurations of the information processing device, program, and information processing system described in the above exemplary embodiments are examples. Obviously, the configurations may be changed without deviating from the gist of the present disclosure.

In the above exemplary embodiments, the processing of an application is executed by software. Alternatively, the processing equivalent thereto may be executed by hardware.

In the third exemplary embodiment, a table indicating the storage sites of tokens for each function is stored in the storage device of the request receiving unit on the cloud. Alternatively, the table may be stored in the storage device of the device. In this case, a manager (for example, a user or the like) of the device is able to change the security levels of individual functions by rewriting the table.

In the above exemplary embodiments, a token is stored in the token storage unit on the cloud or the token storage unit of the device, but the storage site of a token is not limited thereto. The storage site of a token may be a storage device of a server accessible from plural devices. For example, a token may be stored in a storage device of a server connected to a device through an intranet.

In the above exemplary embodiments, each device may be an image forming device including a Web browser installed therein. The functions of a service provided by an application include a function of printing a document stored in a storage device on the cloud, and a function of storing a document read by a scanner of an image forming device in a storage device on the cloud.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system including a plurality of information processing devices each of which is accessible using first authentication information that is given to each of users, that varies among the users, and that is common to the plurality of information processing devices, access to a specific service from an accessed information processing device among the plurality of information processing devices being permitted using second authentication information that is given for the specific service to each of the users and that varies among the users, the information processing system comprising:

- a display controller that, in a case where first access permission information that corresponds to the first authentication information used to access the accessed information processing device and that is for permitting access to the specific service is not stored in a storage unit, performs control to display an input screen for inputting the second authentication information for accessing the specific service; and
- a storage controller that, in a case where the first access permission information is stored in the storage unit and in a case where authentication information input from the input screen matches the second authentication information that is predetermined, permits access to the specific service and performs control to cause the storage unit to store new first access permission information for the specific service in association with the first authentication information used to access the accessed information processing device,
- wherein the information processing system permits access to the storage unit using third authentication information that is given for the specific service to a user belonging to a specific organization,
- wherein the storage controller performs control to cause the storage unit to store the first access permission information as a value corresponding to a character string generated from the first authentication information and the third authentication information.

2. The information processing system according to claim 1, wherein the storage controller permits access to the specific service in a case where the first access permission information that has been obtained is correct.

3. The information processing system according to claim 1, wherein the storage controller permits access to the specific service in a case where the second access permission information obtained from the first access permission information is correct.

4. The information processing system according to claim 1, wherein the information processing system permits access to the storage unit in a case where third access permission information having an effective period and obtained from the third authentication information is correct.

5. The information processing system according to claim 1, wherein the information processing system includes, as the storage unit, a plurality of storage devices including a first storage device disposed outside the plurality of information processing devices and a second storage device disposed in each of the plurality of information processing devices.

6. The information processing system according to claim 5, wherein in a case where the specific service has a plurality of functions, the storage controller performs control to cause the storage unit to store the first access permission information that varies among the plurality of functions.

7. The information processing system according to claim 5, wherein in a case where the specific service has a plurality of functions, the storage controller changes, for each of the plurality of functions, a storage device to store the first access permission information.

8. The information processing system according to claim 1, wherein the storage controller performs control to cause the storage unit to store the first access permission information as a value corresponding to a character string generated from the first authentication information.

9. The information processing system according to claim 8, wherein the character string is any one of a first character string included in the first authentication information, a hash value of the first character string, a second character string included in the first authentication information and different from the first character string, a hash value of the second character string, a third character string obtained by combining the first character string and the second character string, and a hash value of the third character string.

10. The information processing system according to claim 1, wherein the character string is either a fourth character string obtained by combining a character string included in the first authentication information and a character string included in the third authentication information or a hash value of the fourth character string.

11. The information processing system according to claim 1, wherein the display controller and the storage controller are disposed outside the plurality of information processing devices.

12. The information processing system according to claim 1, wherein when the first access permission information is stored in the storage unit and the authentication information input from the input screen matches the second authentication information that is predetermined, the information processing system issues the new first access permission information and a second access permission information, wherein an effective period of the second access permission information is shorter than an effective period of the first access permission information, and wherein the second access permission information is obtained by using the first access permission information when the second access permission information is expired.

13. A non-transitory computer readable medium storing a program causing a computer to execute a process for information processing in an information processing system including a plurality of information processing devices each of which is accessible using first authentication information that is given to each of users, that varies among the users, and that is common to the plurality of information processing devices, access to a specific service from an accessed information processing device among the plurality of information processing devices being permitted using second authentication information that is given for the specific service to each of the users and that varies among the users, the process comprising:

- in a case where first access permission information that corresponds to the first authentication information used to access the accessed information processing device and that is for permitting access to the specific service is not stored in a storage unit, performing control to display an input screen for inputting the second authentication information for accessing the specific service;
- in a case where the first access permission information is stored in the storage unit and in a case where authentication information input from the input screen matches the second authentication information that is predetermined, permitting access to the specific service and performing control to cause the storage unit to store new first access permission information for the specific service in association with the first authentication information used to access the accessed information processing device;

permitting access to the storage unit using third authentication information that is given for the specific service to a user belonging to a specific organization; and performing control to cause the storage unit to store the first access permission information as a value corresponding to a character string generated from the first authentication information and the third authentication information.

14. The non-transitory computer readable medium according to claim 13, wherein when the first access permission information is stored in the storage unit and the authentication information input from the input screen matches the second authentication information that is predetermined, the information processing system issues the new first access permission information and a second access permission information, wherein an effective period of the second access permission information is shorter than an effective period of the first access permission information, and wherein the second access permission information is obtained by using the first access permission information when the second access permission information is expired.

15. An information processing system including a plurality of information processing devices each of which is accessible using first authentication information that is given to each of users, that varies among the users, and that is common to the plurality of information processing devices, access to a specific service from an accessed information processing device among the plurality of information processing devices being permitted using second authentication information that is given for the specific service to each of the users and that varies among the users, the information processing system comprising:

display control means for, in a case where first access permission information that corresponds to the first authentication information used to access the accessed information processing device and that is for permitting access to the specific service is not stored in storage means, performing control to display an input screen for inputting the second authentication information for accessing the specific service; and storage control means for, in a case where the first access permission information is stored in the storage means and in a case where authentication information input from the input screen matches the second authentication information that is predetermined, permitting access to the specific service and performing control to cause the storage means to store new first access permission information for the specific service in association with the first authentication information used to access the accessed information processing device, wherein the information processing system permits access to the storage means using third authentication information that is given for the specific service to a user belonging to a specific organization, wherein the storage control means performs control to cause the storage means to store the first access permission information as a value corresponding to a character string generated from the first authentication information and the third authentication information.

16. The information processing system according to claim 15, wherein when the first access permission information is stored in the storage unit and the authentication information input from the input screen matches the second authentication information that is predetermined, the information processing system issues the new first access permission information and a second access permission information, wherein an effective period of the second access permission information is shorter than an effective period of the first access permission information, and wherein the second access permission information is obtained by using the first access permission information when the second access permission information is expired.

* * * * *